(12) United States Patent
Hady et al.

(10) Patent No.: US 7,953,894 B2
(45) Date of Patent: May 31, 2011

(54) PROVIDING AGGREGATED DIRECTORY STRUCTURE

(75) Inventors: Frank T. Hady, Portland, OR (US); John W. Carroll, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 242 days.

(21) Appl. No.: 12/273,363

(22) Filed: Nov. 18, 2008

(65) Prior Publication Data

US 2010/0125645 A1    May 20, 2010

(51) Int. Cl.
*G06F 15/16* (2006.01)
(52) U.S. Cl. ........ 709/248; 709/213; 709/216; 709/217; 709/224
(58) Field of Classification Search .................. 709/213, 709/216, 217, 224, 248
See application file for complete search history.

(56) References Cited

U.S. PATENT DOCUMENTS

| | | | |
|---|---|---|---|
| 2006/0020716 A1* | 1/2006 | Suryanarayana | 709/248 |
| 2006/0149828 A1* | 7/2006 | Kikinis | 709/217 |
| 2006/0195340 A1* | 8/2006 | Smitherman et al. | 705/2 |
| 2007/0116248 A1* | 5/2007 | Samama | 379/355.04 |
| 2009/0006972 A1* | 1/2009 | Karlson et al. | 715/737 |
| 2009/0075642 A1* | 3/2009 | Rantapuska et al. | 455/422.1 |
| 2009/0190739 A1* | 7/2009 | McGary et al. | 379/218.01 |
| 2010/0042235 A1* | 2/2010 | Basso et al. | 700/94 |

OTHER PUBLICATIONS

Zadok, Erez et al., "On Incremental File System Development", vol. 2 (2), ACM Transactions on Storage,(May 2006),1-33 pgs.
Leach, Paul J., et al., "A Common Internet File System (CIFS/1.0) Protocol", Preliminary Draft, http://tools.ietf.org/id/draft-leach-cifs-v1-spec-01.txt,(Oct. 9, 2008),1-168 pgs.
"Linux", Kernel Korner—Unionfs: Bringing Filesystems Together, 1-10 pgs.
Sipek, Josef et al.,"Making Linux Stacking-Friendly (an abstract)", http://www.filesystems.org/docs/Isf07unionfs/index.html, (Sep. 18, 2008), 1-2 pgs.
"Using Network Attached Storage for Reliable Backup and Recovery", Microsoft Corporation & Dell, (Jul. 2003),1-19 pgs.
"Network-attached storage", http://en.wikipedia.org/wiki/Network-attached_storage, (Sep. 18, 2008),1-13 pgs.
Sipek, Josef et al., "Kernel Support for Stackable File Systems", Stony Brook University, 1-5 pgs.
Quigley, David et al., "Unionfs: User- and Community-Oriented Development of a Unification File System", Stony Brook University, 1-14 pgs.
Wright, Charles P., et al., "Versatility and Unix Semantics in Namespace Unification", vol. 1 (4), (Nov. 2005),1-29 pgs. Wright, Charles P., et al., "Versatility and Unix Semantics in a Fan-Out Unification File System", Technical Report FSL-04-01b, 1-14 pgs.
"Windows Home Server", Technical Brief; Home Computer Backup and Restore, 1-27 pgs.
Hady, Frank et al., "U.S. Appl. No. 11/900,748, filed Sep. 13, 2007."

* cited by examiner

*Primary Examiner* — Liangche A Wang
(74) *Attorney, Agent, or Firm* — Christopher K. Gagne

(57) ABSTRACT

In an embodiment, circuitry residing, at least in part, at a first network node may initiate, at least in part, replicating, at least in part, at the first node of a file space at a second network node, may detect, at least in part, modification at the second node of the file space, and may initiate, at least in part, corresponding modification at the first node of a replication of the file space. The circuitry also may generate, at least in part, an aggregated directory structure including, at least in part, the file space and another file space resident, at least in part, remotely from the second node. The directory structure may be provided, at least in part, to the second node prior, at least in part, to completion of the replicating, at least in part, at the first node of the file space.

20 Claims, 3 Drawing Sheets

PROVIDING AGGREGATED DIRECTORY STRUCTURE

FIELD

This disclosure relates to providing aggregated directory structure.

BACKGROUND

In one conventional network arrangement, first and second computers are coupled to network storage. Each of the computers stores respective data in respective directory structures. In order to make data stored in a first computer available to the second computer, a human operator of the first computer manually enters commands at the first computer that result in the data being copied from the first computer to the network storage. Likewise, in order to make data stored in the second computer available to the first computer, a human operator of the second computer manually enters commands at the second computer that result in the second computer's data being copied from the second computer to the network storage. Thereafter, one or more human operators enter commands at the computers and/or network storage that result in the copied data at the network storage being re-organized from the respective directory structures used in the computers into a single directory structure in the network storage. The computers thereafter access the copied data at the network storage in accordance with the single directory structure in the network storage. As new data is stored and/or previously copied data is modified in the computers, the above process is repeated. Disadvantageously, the repeated involvement of human operators and human operator-entered commands in this conventional arrangement increases the likelihood of data copying and directory structure errors, and reduces the time and cost efficiencies of this conventional arrangement.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
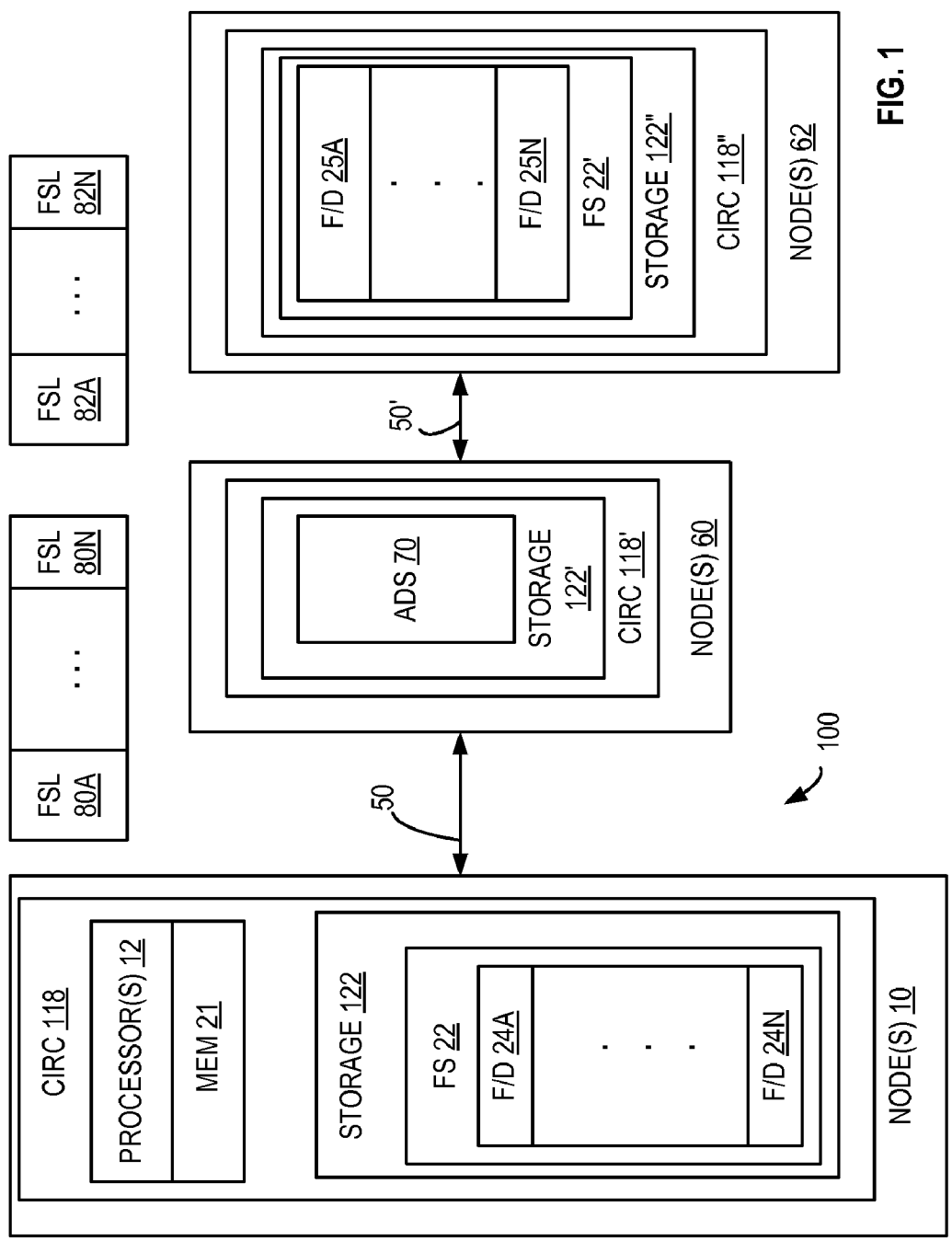
FIG. 1 illustrates a system embodiment.

FIG. 1 illustrates a system embodiment 100. System 100 may include one or more network nodes 10 that may be communicatively coupled via one or more wireless and/or wired communication links 50 to one or more other network nodes 60. System 100 also may include one or more other network nodes 62 that may be communicatively coupled to one or more nodes 60 via one or wireless and/or wired communication links 50'. In this embodiment, a "network node" or "node" may be used interchangeably to mean an entity communicatively coupled in and/or to a network, such as, for example, an end station, appliance, intermediate station, network interface, client, server, and/or portion thereof In this embodiment, a "network" may be or comprise two or more nodes that are communicatively coupled together. Also in this embodiment, a node may be "communicatively coupled" to another node if the one node is capable of transmitting to and/or receiving from the other node one or more packets. As used herein, a "wireless communication link" means any modality, and/or portion thereof, that permits, at least in part, at least two nodes to be wirelessly communicatively coupled, at least in part. Also as used herein, a "wired communication link" means any modality and/or portion thereof, that permits, at least in part, at least two nodes to be communicatively coupled, at least in part, via non-wireless means, at least in part. As used herein, a "packet" may comprise one or more symbols and/or values.

In this embodiment, one or more nodes 10 and/or one or more nodes 62 may comprise one or more respective client host computer systems. One or more nodes 60 may comprise one or more network attached storage (NAS) server nodes. Additionally or alternatively, without departing from this embodiment, one or more nodes 10 and/or 62 may comprise one or more digital media appliances, one or more smart phone and/or thin client devices, and/or one or more set top box devices. Of course, many variations, modifications, and alternatives are possible.

In this embodiment, as shown in FIG. 1, one or more nodes 10 may comprise operative circuitry 118. Circuitry 118 may comprise one or more host processors 12, computer-readable/writable memory 21, and storage 122. Each of the host processors 12 may be coupled to computer-readable/writable memory 21 via a not shown memory hub system. Each of the one or more host processors 12 may comprise, for example, a respective Intel® microprocessor (and/or chipset) that is commercially available from the Assignee of the subject application. As used herein, a "processor" means circuitry capable of performing, at least in part, one or more arithmetic and/or logical operations. Of course, alternatively, each of the host processors 12 may comprise, for example, a respective microprocessor (and/or chipset) that is manufactured and/or commercially available from a source other than the Assignee of the subject application, without departing from this embodiment. One or more nodes 10 also may comprise a not shown user interface system may comprise, e.g., a keyboard, pointing device, and display system that may permit a human user to input commands to, and monitor the operation of, system 100. Circuitry 118 may comprise not shown network interface controller circuitry that may permit one or more nodes 10 to be communicatively coupled via one or more wireless communication links 50 to one or more nodes 60.

One or more machine-readable program instructions may be stored in computer-readable/writable memory 21. In operation of one or more nodes 10, these instructions may be accessed and executed by one or more host processors 12. When executed by one or more host processors 12, these one or more instructions may result in operative circuitry 118 and/or host processor 12 performing the operations described herein as being performed by operative circuitry 118 and/or host processor 12. Also when executed by one or more host processors 12, these one or more instructions may result in one or more file spaces 22 becoming resident, at least in part, in storage 122 and/or (although not shown in FIG. 1) memory 21. Computer-readable/writable memory 21 may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory.

As used herein, "storage" may mean one or more apparatus and/or one or more portions thereof into, and/or from which, data may be stored and/or retrieved, respectively. Also as used in herein, the terms "mass storage" and "mass storage device" may be used interchangeably to mean storage capable of non-volatile storage of data. For example, in this embodiment, storage 122, storage 122', and/or storage 122" may each comprise respective mass storage that may comprise respective semiconductor, electromechanical, magnetic, and/or optical storage and/or mass storage, such as, for example, respective flash, magnetic disk, and/or optical disk storage and/or mass storage. As used herein, "circuitry" may comprise, for example, singly or in any combination, analog circuitry, digital circuitry, hardwired circuitry, programmable circuitry, state machine circuitry, and/or memory that may comprise program instructions that may be executed by programmable circuitry.

One or more nodes 60 may comprise respective operative circuitry 118' whose construction may conform, in whole or in part, to the construction of circuitry 118'. Thus, although not shown in FIG. 1, circuitry 118' may comprise one or more not shown host processors and memory whose construction may conform, in whole or in part, to the construction of one or more host processors 12 and memory 21, respectively. Circuitry 118' may comprise a not shown network interface controller that may permit one or more nodes 60 to be communicatively coupled to one or more nodes 10 via one or more links 50, and to be communicatively coupled to one or more nodes 62 via one or more links 50'. Circuitry 118' may comprise storage 122'.

One or more machine-readable program instructions may be stored in the not shown computer-readable/writable memory that may be comprised in circuitry 118'. In operation of one or more nodes 60, these instructions may be accessed and executed by the one or more not shown host processors that may be comprised in circuitry 118'. When executed by these one or more host processors, these one or more instructions may result in operative circuitry 118' and/or the one or more host processors performing the operations described herein as being performed by operative circuitry 118' and/or one or more host processors. Also when executed by one or more host processors, these one or more instructions may result in ADS 70 being generated and becoming resident, at least in part, in storage 122' and/or the not shown memory that may be comprised in circuitry 118'.

One or more nodes 62 may comprise respective operative circuitry 118" whose construction may conform, in whole or in part, to the construction of circuitry 118. Thus, although not shown in FIG. 1, circuitry 118" may comprise one or more not shown host processors and memory whose construction may conform, in whole or in part, to the construction of one or more host processors 12 and memory 21, respectively. Circuitry 118" may comprise a not shown network interface controller that may permit one or more nodes 62 to be communicatively coupled to one or more nodes 60 via one or more links 50'. Circuitry 118" may comprise storage 122".

One or more machine-readable program instructions may be stored in the not shown computer-readable/writable memory that may be comprised in circuitry 118". In operation of one or more nodes 62, these instructions may be accessed and executed by the one or more not shown host processors that may be comprised in circuitry 118". When executed by these one or more host processors, these one or more instructions may result in operative circuitry 118" and/or the one or more host processors performing the operations described herein as being performed by operative circuitry 118" and/or one or more host processors. Also when executed by one or more host processors, these one or more instructions may result in one or more file spaces 22' becoming resident, at least in part, in storage 122" and/or the not shown memory that may be comprised in circuitry 118".

One or more communication links 50 and/or 50' may be compatible with one or more communication protocols. For example, in this embodiment, one or more links 50 and/or 50' may be compatible with, e.g., Ethernet protocol and/or Transmission Control Protocol/Internet Protocol (TCP/IP) protocol. Additionally or alternatively, one or more links 50 and/or 50' may be compatible with, e.g., one or more wireless communication protocols.

The Ethernet protocol that may be used in system 100 may comply or be compatible with the protocol described in Institute of Electrical and Electronics Engineers, Inc. (IEEE) Std. 802.3, 2000 Edition, published on Oct. 20, 2000. Alternatively or additionally, the TCP/IP protocol that may be used in system 100 may comply or be compatible with the protocols described in Internet Engineering Task Force (IETF) Request For Comments (RFC) 791 and 793, published September 1981. Additionally or alternatively, the one or more wireless communication protocols that may be used in system 100 may comply or be compatible with IEEE 802.11-1999: Wireless LAN Medium Access Control (MAC) and Physical Layer (PHY) Specifications, IEEE Working Group (1999-07-15), published 1999, IEEE, Inc., and/or other and/or later-developed wireless protocols. Of course, many different communication protocols may be used for such data and/or command exchange without departing from this embodiment.

In system 100, each of the one or more nodes 10, 60, and/or 62 may be respectively geographically remote from, at least in part, each other. Thus, for example, one or more nodes 10 may be geographically remote from, at least in part, one or more nodes 60 and/or one or more nodes 62. Likewise, one or more nodes 60 may be geographically remote from, at least in part, one or more nodes 10 and/or 62. Also, one or more nodes 62 may be geographically remote from, at least in part, one or more nodes 60 and/or 10.

Figure 2:
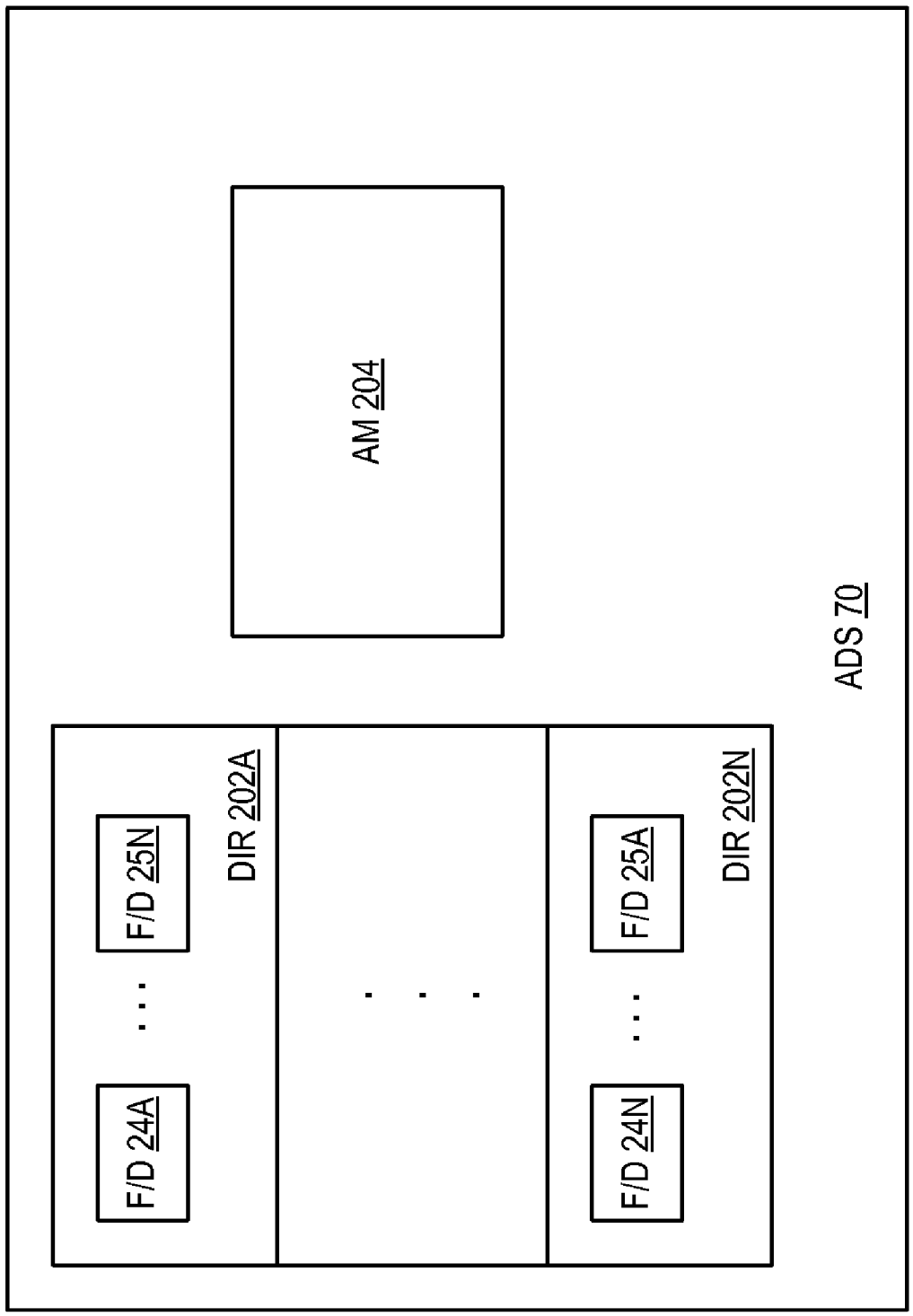
FIG. 2 illustrates aggregated directory structure (ADS) in an embodiment.
Figure 3:
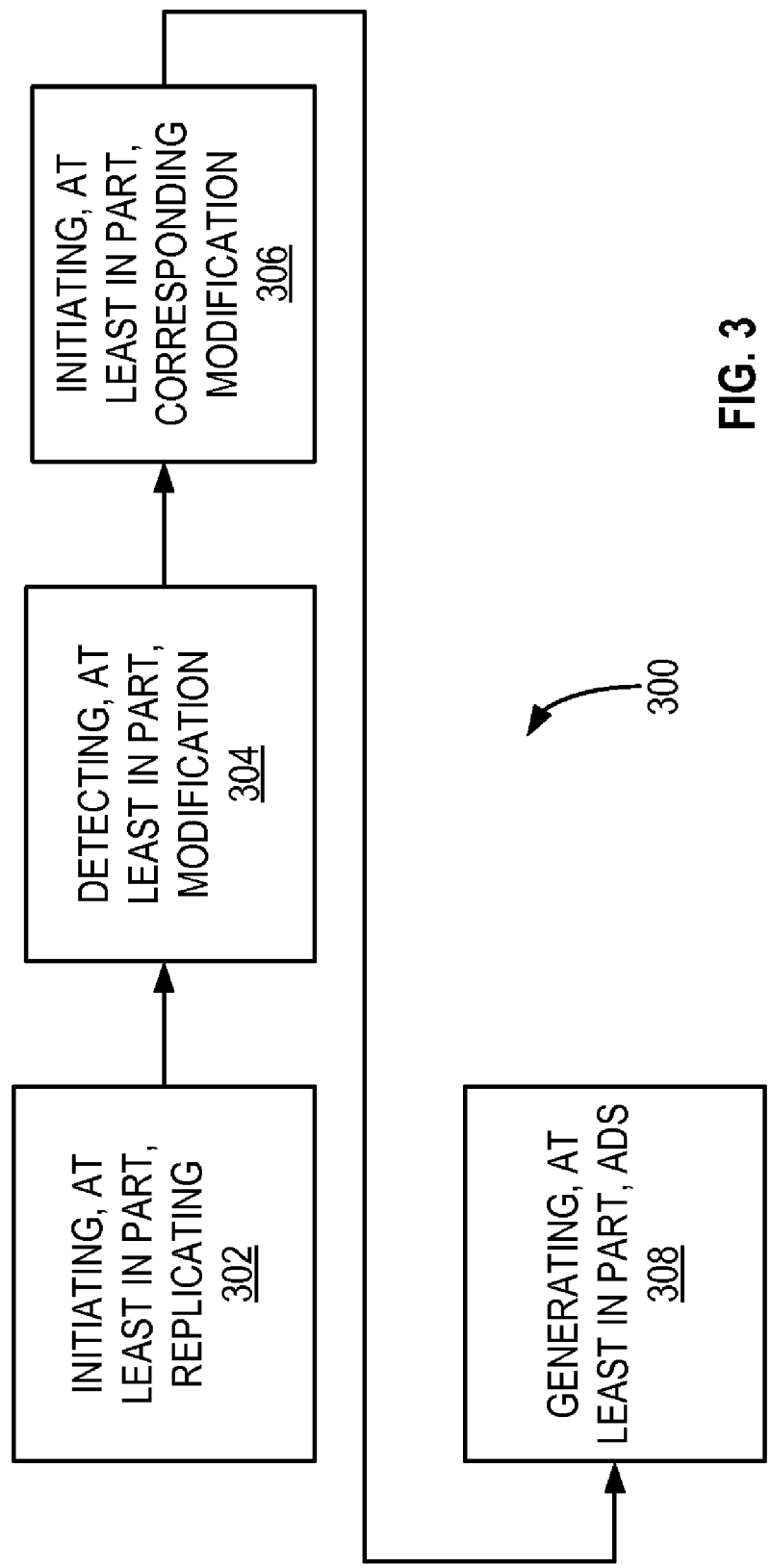
FIG. 3 illustrates operations that may be performed according to an embodiment.

With reference being made to FIGS. 1-3, operations 300 that may be performed in system 100 according to an embodiment will now be described. After, for example, a reset of one or more nodes 10, 60, and/or 62, and/or of system 100, circuitry 118' may initiate, at least in part, the opening of (1) a plurality of file sharing links 80A . . . 80N between one or more nodes 60 and one or more nodes 10, and (2) a plurality of file sharing links 82A . . . 82N between one or more nodes 60 and one or more nodes 62. File sharing links 80A . . . 80N may be opened and established, at least in part, via one or more communication links 50, and may permit, at least in part, circuitry 118' and/or circuitry 118 to replicate, at least in part, one or more file spaces 22 and to detect, at least in part, modification, at least in part, of the one or more files spaces 22. File sharing links 82A . . . 82N may be opened and established, at least in part, via one or more communication links 50', and may permit, at least in part, circuitry 118' and/or circuitry 118" to replicate, at least in part, one or more file spaces 22' and to detect, at least in part, modification, at least in part, of the one or more files spaces 22'. In this embodiment, each of the file sharing links 80A . . . 80N, 82A . . . 82N may comply and/or be compatible with Common Internet File System (CIFS) protocol described in, e.g., "A Common Internet File System (CIFS/1.0) Protocol, Preliminary Draft," IETF, Dec. 19, 1997, and/or other and/or later-developed versions of this protocol. Without departing from this embodiment, one or more of the file sharing links 80A . . . 80N, 82A . . . 82N may comply and/or be compatible with other and/or additional protocols.

The file sharing links 80A . . . 80N, 82A . . . 82N may be opened, at least in part, and/or mapped, at least in part, by circuitry 118'. Alternatively or additionally, one or more of the file sharing links 80A . . . 80N and/or 82A . . . 82N may be opened, at least in part, and/or mapped, at least in part, by circuitry 118 and/or circuitry 118" without departing from this embodiment.

File sharing links 80A . . . 80N may expose to circuitry 118' and may permit circuitry 118' and/or circuitry 118 to initiate, at least in part, replicating, at least in part, at one or more nodes 60 of one or more file spaces 22 residing, at least in part, at one or more nodes 10. File sharing links 82A . . . 82N may expose to circuitry 118' and may permit circuitry 118' and/or circuitry 118" to initiate, at least in part, replicating, at least in part, at one or more nodes 60 of one or more file spaces 22' residing, at least in part, at one or more nodes 62.

As shown in FIG. 1, one or more file spaces 22 may comprise a plurality of files and/or directories (collectively and/or singly shown as elements 24A . . . 24N). Additionally, one or more file spaces 22' may comprise a plurality of files and/or directories (collectively and/or singly shown as elements 25A . . . 25N). In this embodiment, respective pluralities of files and/or directories comprised in one or more file spaces 22 and/or 22' may be of the same or similar respective types. For example, in this embodiment, files and/or directories 24A and 25N may be or comprise music files and/or directories (e.g., comprising data and/or commands derived from, at least in part, audio and/or audible signals, and/or based upon which, at least in part, such signals may be reproduced, at least in part); such files and/or directories may have and/or be associated with one or more "music" file and/or directory types. Also for example, in this embodiment, files and/or directories 24N and 25A may be or comprise video files and/or directories (e.g., comprising data and/or commands derived from, at least in part, video and/or motion picture signals, and/or based upon which, at least in part, such signals may be reproduced, at least in part); such files and/or directories may have and/or be associated with one or more "video" file and/or directory types. The respective types of the files and/or directories may be determined, at least in part, by circuitry 118' based, at least in part, upon, for example, the names, contents, encoding, metadata, etc. of such files and/or directories.

After the file sharing links 80A . . . 80N have been opened, circuitry 118' may initiate, at least in part, replicating, at least in part, at one or more nodes 60 of one or more file spaces 22 residing, at least in part, at one or more nodes 10, as illustrated by operation 302 in FIG. 3. Also after the file sharing links 82A . . . 82N have been opened, circuitry 118' may initiate, at least in part, replicating, at least in part, at one or more nodes 60 of one or more file spaces 22' residing, at least in part, at one or more nodes 62, as also illustrated by operation 302 in FIG. 3. Circuitry 118' (in conjunction with circuitry 118) may replicate, at least in part, in storage 122' at one or more nodes 60 one or more file spaces 22. Circuitry 118' (in conjunction with circuitry 118") may replicate, at least in part, in storage 122' at one or more nodes 60 one or more file spaces 22'.

In this embodiment, the initiating, at least in part, of the replicating of one or more file spaces 22 and/or one or more file spaces 22', and/or the generating, at least in part, of the ADS 70, by circuitry 118', at least in part, may be in response, at least in part, to at least one event. The at least one event may comprise (a) the communicative coupling of the one or more nodes 60 to one or more nodes 10 and/or one or more nodes 62, and/or (b) the elapsing of a predetermined time period. The communicative coupling of the one or more nodes 60 to one or more nodes 10 and/or to one or more nodes 62 may be after, e.g., a reset of one or more nodes 60, 10, and/or 62, and/or after resetting of system 100. The opening of the file sharing links 80A . . . 80N and/or 82A . . . 82N may be in response, at least in part, to the communicative coupling of the one or more nodes 60 to one or more nodes 10 and/or 62, respectively. The predetermined time period may elapse after, for example, a predetermined amount of time has elapsed after a most recent modification was made to one or more file spaces 22 and/or one or more file spaces 22'.

After replication of the one or more file spaces 22 and/or one or more file spaces 22', circuitry 118' may detect, at least in part, modification at one or more nodes 10 and/or 62 of one or more file spaces 22 and/or one or more file spaces 22', as illustrated by operation 304 in FIG. 3. In response, at least in part, to the detection of this modification, circuitry 118' may initiate, at least in part, corresponding modification at one or more nodes 60 of the replication of one or more file spaces 22 and/or one or more file spaces 22', as illustrated by operation 306 in FIG. 3. As used in this embodiment, a "modification" of a file space may comprise change of any kind, including, addition and/or deletion, and/or change in one or more attributes, such as, name, contents, metadata, etc. of one or more files and/or one or more directories.

For example, circuitry 118 may modify one or more files and/or directories 24A. Circuitry 118' may detect, at least in part, as a result of operation 304, this modification. Circuitry 118' initiate, at least in part (as a result of operation 306), and implement, at least in part, a corresponding modification to the replication of the one or more files and/or directories 24A that may be comprised in the replication of one or more file spaces 22 that may be stored in storage 122'.

After replicating, at least in part, one or more file spaces 22 and/or one or more file spaces 22', circuitry 118' may generate, at least in part, ADS 70, as illustrated by operation 308 in FIG. 3. ADS 70 may include, at least in part, both the at least one file space 22 and the at least one file space 22'. In this embodiment, the ADS 70 may be provided, at least in part, by the circuitry 118' prior, at least in part, to the completion of the replicating, at least in part, at one or more nodes 60 of one or more file spaces 22 and/or one or more file spaces 22'.

After the completion of the replicating of the one or more file spaces 22 and the one or more file spaces 22', the ADS 70 may comprise one or more copies of the one or more file spaces 22 and one or more file spaces 22'. After the completion, at least in part, of the replicating of the one or more file spaces 22 and/or one or more file spaces 22', one or more nodes 10 and/or one or more nodes 62 may access, at least in part, the one or more file spaces 22 and/or one or more file spaces 22' at the one or more nodes 60 (i.e., the one or more replicated copies thereof in ADS 70) via the ADS 70. Conversely, prior to the completion, at least in part, of this replicating, the one or more nodes 10 and/or one or more nodes 62 may access, at least in part, the one or more file spaces 22' and/or one or more file spaces 22, respectively, resident at the one or more nodes 60 and/or one or more nodes 10, respectively, via the aggregated mapping 204 of these file spaces 22' and/or 22 comprised in ADS 70.

For example, in this embodiment, as shown in FIG. 2, ADS 70 generated, at least in part, as part of operation 308 may comprise aggregated mapping (AM) 204 and a plurality of directories 202A . . . 202N. Directories 202A . . . 202N may comprise copies of the contents of the one or more file spaces 22 and one or more file spaces 22'. AM 204 (shown symbolically in FIG. 2) may include a mapping of the contents of the one or more file spaces 22 and one or more file spaces 22' into a single, merged file system, in accordance with and that represents the directories 202A . . . 202N. The mapping 204 may associate the contents (e.g., files and/or directories 24A . . . 24N and/or 25A . . . 25N) of one or more file spaces 22 and/or 22', respectively, the replicated copies thereof in ADS 70, and their respective locations (physical and/or logical) in system 100 in a single, merged file system, such that the contents of the one or more files spaces 22 and/or 22', and/or the replicated copies thereof may be accessible via the ADS 70.

For example, as shown in FIG. 2, in the ADS 70, copies of the contents of the one or more file spaces 22 and/or 22' (e.g., files and/or directories 24A . . . 24N and/or 25A . . . 25N, respectively) may be re-organized into a single, merged file system that includes directories 202A . . . 202N. In this embodiment, the re-organization may be such that respective sets of files and/or directories having and/or associated with the same respective file and/or directory types may be sorted based at least in part upon and/or associated into the same respective directories. For example, files and/or directories (such as, files and/or directories 24A and 25N) associated with a music file and/or directory type may be associated into directory 202A. Conversely, files and/or directories (such as, files and/or directories 24N and 25A) associated with a video file and/or directory type may be associated into directory 202N. Other files and/or directories (not shown) in one or more file spaces 22 and/or one or more file spaces 22' likewise may be associated into one or more directories in ADS 70 based, at least in part upon their respective file and/or directory types. Thus, in ADS 70 the files and/or directories 24A . . . 24N and/or 25A . . . 25N in one or more file spaces 22 and/or one or more file spaces 22' may be sorted, at least in part, according to their file and/or directory types, and associated, at least in part, into directories 202A . . . 202N based, at least in part, upon such file and/or directory types.

AM 204 may reflect, at least in part, these associations of files and/or directories into directories 202A . . . 202N. For example, AM 204 may associate the contents (e.g., files and/or directories 24A . . . 24N and/or 25A . . . 25N) of one or more file spaces 22 and/or 22', respectively, the replicated copies thereof in ADS 70, and their respective locations (physical and/or logical) in system 100 in a single, merged file system, and their associations into directories 202A . . . 202N, such that the contents of the one or more files spaces 22 and/or 22', and/or the replicated copies thereof may be accessible via the ADS 70 and their associations with directories 202A . . . 202N is reflected in AM 204.

Prior to the completion, at least in part, of the replicating, at least in part, at the one or more nodes 60 of the one or more file spaces 22 resident at one or more nodes 10, ADS 70 may not contain a complete copy of all of one or more file spaces 22. In this case, if one or more nodes 62 attempts to access the one or more file spaces 22 via the ADS 70, the contents of the ADS 70 result in the one or more nodes 62 accessing the one or more file spaces 22 at the one or more nodes 10. Conversely, after completion of this replicating, ADS 70 may contain a complete copy of one or more file spaces 22; in this case, if one or more nodes 62 attempts to access the one or more file spaces 22 via the ADS 70, the contents of the ADS 70 result in one or more nodes 62 accessing the copy of one or more file spaces 22 comprised in ADS 70.

Likewise, prior to the completion, at least in part, of the replicating, at least in part, at the one or more nodes 60 of the one or more file spaces 22' resident at one or more nodes 62, ADS 70 may not contain a complete copy of all of one or more file spaces 22'. In this case, if one or more nodes 10 attempts to access the one or more file spaces 22' via the ADS 70, the contents of the ADS 70 results in the one or more nodes 10 accessing the one or more file spaces 22' at the one or more nodes 62. Conversely, after completion of this replicating, ADS 70 may contain a complete copy of one or more file spaces 22'; in this case, if one or more nodes 10 attempts to access the one or more file spaces 22' via the ADS 70, the contents of the ADS 70 results in the one or more nodes 62 accessing the copy of one or more file spaces 22' comprised in ADS 70.

Thus, in an embodiment, circuitry residing, at least in part, at a first network node may initiate, at least in part, replicating, at least in part, at the first node of a file space at a second network node, may detect, at least in part, modification at the second node of the file space, and may initiate, at least in part, corresponding modification at the first node of a replication of the file space. The circuitry also may generate, at least in part, an ADS including, at least in part, the file space and another file space resident, at least in part, remotely from the second node. The ADS may be provided, at least in part, to the second node prior, at least in part, to completion of the replicating, at least in part, at the first node of the file space.

Advantageously, in this embodiment, the repeated involvement of human operators and human operator-entered commands (utilized in conventional arrangements) need not be utilized. Accordingly, this decreases the likelihood of data copying and directory structure errors, and increases the time and cost efficiencies of this embodiment compared to these conventional arrangements.

Also in this embodiment, the ADS 70 may be provided prior, at least in part, to the completion of the replicating, at least in part, of the one or more file spaces 22 and/or one or more file spaces 22'. Advantageously, this may permit these one or more file spaces to be accessible to a greater degree than is possible in the prior art. Additionally, in this embodiment, a copy of the one or more file spaces 22 and/or one or more file spaces 22' may be maintained at the one or more nodes 60. Advantageously, this may permit the copy of one or more file spaces 22 and/or one or more file spaces 22' to be accessible in the event that the one or more nodes 10 and/or one or more nodes 62 are removed from the system 100, and/or in event that the one or more file spaces 22 and/or one or more file spaces 22' resident in the one or more nodes 10 and/or one or more nodes 62 become corrupted. Further advantageously, the ADS 70 provides a single, merged file system via which all of the contents of the one or more file spaces 22 and one or more file spaces 22' may be accessible in such a way that a human user accessing the contents is not necessarily required to be aware of the particular node or nodes of origin of the contents. Also advantageously, circuitry 118' may be capable of detecting, at least in part, modification to one or more file spaces 22 and/or one or more file spaces 22', and may initiate, at least in part, in response at least in part to such detected modification, corresponding modification to the replicated copy of the file spaces in the ADS 70. This detection, may result, at least in part, for example, without additional user intervention and/or interaction (1) from comparison by circuitry 118' of one or more requested portions of the one or more file spaces 22 and/or one or more file spaces 22' with one or more corresponding portions of the replicated copy in ADS 70, and/or (2) by a signaling of circuitry 118' by circuitry 118 and/or circuitry 118" when modification is made to one or more file spaces 22 and/or one or more file spaces 22'. This reduces the amount of user-intervention and/or interaction needed for such updates, compared to the prior art.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Indeed, without departing from this embodiment, system 100 may include more or fewer than the elements shown in the Figures and described previously herein as being comprised system 100. Accordingly, the claims are intended to cover all such equivalents.

What is claimed is:

1. An apparatus comprising:
circuitry, residing, at least in part, at a first network node, the circuitry being initiate, at least in part, replicating, at least in part, at the first network node of at least one file space residing, at least in part, at a second network node, the circuitry also being to detect, at least in part, modification at the second network node of the at least one file space and to initiate, at least in part, corresponding modification at the first network node of a replication of at least one file space, the circuitry also being to initiate, at least in part, replicating, at least in part, at the first network node of at least one other file space residing, at least in part, at a third network node, the circuitry also being to generate, at least in part, an aggregated directory structure at the first network node that includes, at least in part, both the at least one file space and the at least one other file space, the aggregated directory structure being provided, at least in part, to the second network node prior, at least in part, to completion of the replicating, at least in part, at the first network node of the at least one file space and the at least one other file space, the second network node being to access, after the completion of the replicating at the first network node of the at least one other file space, a copy of at least one other file space in the aggregated directory structure at the first network node, the second network node being to access, prior to the completion of the replicating at the first network node of the at least one other file space, the at least one other file space at the third network node via an aggregated mapping in the aggregated directory structure at the first network node.

2. The apparatus of claim 1, wherein:
the circuitry is to initiate, at least in part, the replicating and to generate, at least in part, the aggregated directory structure, in response, at least in part, to at least one event, the at least one event comprising at least one of (a) communicative coupling of the second network node to the first network node and (b) elapsing of a predetermined time period; and
the third network node is remote from the first network node and the second network.

3. The apparatus of claim 2, wherein:
the at least one file space and the at least one other file space are accessible, at least in part, by the third network node via the aggregated directory structure.

4. The apparatus of claim 3, wherein:
prior to the completion of the replicating, at least in part, at the first network node of the at least one file space, the at least one file space is accessible, at least in part, at the second network node via the aggregated directory structure; and
after the completion of the replicating, at least in part, at the first network node of the at least one file space, the at least one file space is accessible, at least in part, at the first network node via the aggregated directory structure.

5. The apparatus of claim 4, wherein:
the at least one file space comprises files associated with at least one of respective file types and directories; and
in the aggregated directory structure, the files are sorted, at least in part, according to the at least one of the file types and directories.

6. The apparatus of claim 5, wherein:
the circuitry is to initiate opening of a plurality of file sharing links between the first network node and the second network node to permit the circuitry to replicate, at least in part, the at least one file space and to detect, at least in part, the modification of the at least one file space.

7. The apparatus of claim 6, further comprising:
at least one wireless communication link between the first network node and the second network node.

8. A method comprising:
initiating, at least in part, by circuitry residing at least in part at a first network node, replicating, at least in part, at the first network node of at least one file space residing, at least in part, at a second network node and at least one other file space residing, at least in part, at a third network node;
detecting, at least in part, by the circuitry modification at the second network node of the at least one file space;
initiating, at least in part, by the circuitry corresponding modification at the first network node of a replication of at least one file space; and
generating, at least in part, by the circuitry an aggregated directory structure at the first network node that includes, at least in part, both the at least one file space and the at least one other file space, the aggregated directory structure being provided, at least in part, to the second network node prior, at least in part, to completion of the replicating, at least in part, at the first network node of the at least one file space and the at least one other file space, the second network node being to access, after the completion of the replicating at the first network node of the at least one other file space, a copy of at least one other file space in the aggregated directory structure at the first network node, the second network node being to access, prior to the completion of the replicating at the first network node of the at least one other file space, the at least one other file space at the third network node via an aggregated mapping in the aggregated directory structure at the first network node.

9. The method of claim 8, wherein:
the circuitry is to initiate, at least in part, the replicating and to generate, at least in part, the aggregated directory structure, in response, at least in part, to at least one event, the at least one event comprising at least one of (a) communicative coupling of the second network node to the first network node and (b) elapsing of a predetermined time period; and
the a third network node is remote from the first network node and the second network.

10. The method of claim 9, wherein:
the at least one file space and the at least one other file space are accessible, at least in part, by the third network node via the aggregated directory structure.

11. The method of claim 10, wherein:
prior to the completion of the replicating, at least in part, at the first network node of the at least one file space, the at least one file space is accessible, at least in part, at the second network node via the aggregated directory structure; and after the completion of the replicating, at least in part, at the first network node of the at least one file space, the at least one file space is accessible, at least in part, at the first network node via the aggregated directory structure.

12. The method of claim 11, wherein:

the at least one file space comprises files associated with at least one of respective file types and directories; and in the aggregated directory structure, the files are sorted, at least in part, according to the at least one of the file types and directories.

13. The method of claim 12, wherein:

the circuitry is to initiate opening of a plurality of file sharing links between the first network node and the second network node to permit the circuitry to replicate, at least in part, the at least one file space and to detect, at least in part, the modification of the at least one file space.

14. The method of claim 13, wherein:

at least one wireless communication link is provided between the first network node and the second network node.

15. Computer-readable memory storing one or more instructions that when executed by a machine result in execution of operations comprising:

initiating, at least in part, by circuitry residing at least in part at a first network node, replicating, at least in part, at the first network node of at least one file space residing, at least in part, at a second network node and at least one other file space residing, at least in part, at a third network node;

detecting, at least in part, by the circuitry modification at the second network node of the at least one file space;

initiating, at least in part, by the circuitry corresponding modification at the first network node of a replication of at least one file space; and generating, at least in part, by the circuitry an aggregated directory structure at the first network node that includes, at least in part, both the at least one file space and the at least one other file space, the aggregated directory structure being provided, at least in part, to the second network node prior, at least in part, to completion of the replicating, at least in part, at the first network node of the at least one file space and the at least one other file space, the second network node being to access, after the completion of the replicating at the first network node of the at least one other file space, a copy of at least one other file space in the aggregated directory structure at the first network node, the second network node being to access, prior to the completion of the replicating at the first network node of the at least one other file space, the at least one other file space at the third network node via an aggregated mapping in the aggregated directory structure at the first network node.

16. The memory of claim 15, wherein:

the circuitry is to initiate, at least in part, the replicating and to generate, at least in part, the aggregated directory structure, in response, at least in part, to at least one event, the at least one event comprising at least one of (a) communicative coupling of the second network node to the first network node and (b) elapsing of a predetermined time period; and the third network node is remote from the first network node and the second network.

17. The memory of claim 16, wherein:

the at least one file space and the at least one other file space are accessible, at least in part, by the third network node via the aggregated directory structure.

18. The memory of claim 17, wherein:

prior to the completion of the replicating, at least in part, at the first network node of the at least one file space, the at least one file space is accessible, at least in part, at the second network node via the aggregated directory structure; and after the completion of the replicating, at least in part, at the first network node of the at least one file space, the at least one file space is accessible, at least in part, at the first network node via the aggregated directory structure.

19. The memory of claim 18, wherein:

the at least one file space comprises files associated with at least one of respective file types and directories; and in the aggregated directory structure, the files are sorted, at least in part, according to the at least one of the file types and directories.

20. The memory of claim 19, wherein:

the circuitry is to initiate opening of a plurality of file sharing links between the first network node and the second network node to permit the circuitry to replicate, at least in part, the at least one file space and to detect, at least in part, the modification of the at least one file space.

* * * * *

UNITED STATES PATENT AND TRADEMARK OFFICE
CERTIFICATE OF CORRECTION

| | | |
|---|---|---|
| PATENT NO. | : 7,953,894 B2 | Page 1 of 1 |
| APPLICATION NO. | : 12/273363 | |
| DATED | : May 31, 2011 | |
| INVENTOR(S) | : Frank T. Hady et al. | |

It is certified that error appears in the above-identified patent and that said Letters Patent is hereby corrected as shown below:

On the Title Page, item (56), under "Other Publications", in column 2, line 24, after "filed" insert -- on --.

In column 10, line 56, in Claim 9, before "third" delete "a".

Signed and Sealed this
Ninth Day of August, 2011

David J. Kappos
*Director of the United States Patent and Trademark Office*